May 27, 1924.
C. E. CHAPMAN
TIRE TOOL
Filed May 11, 1923
1,495,884
2 Sheets-Sheet 1
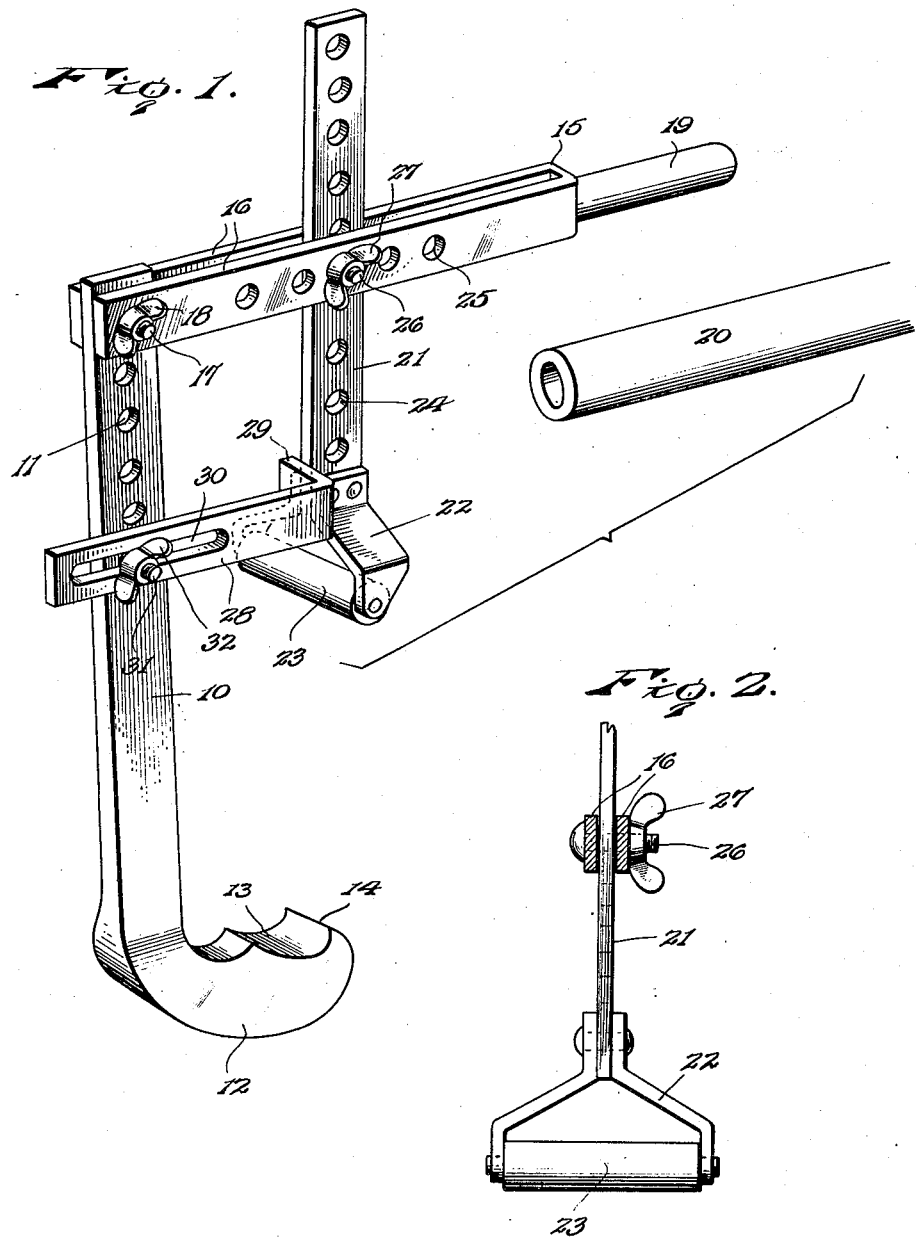

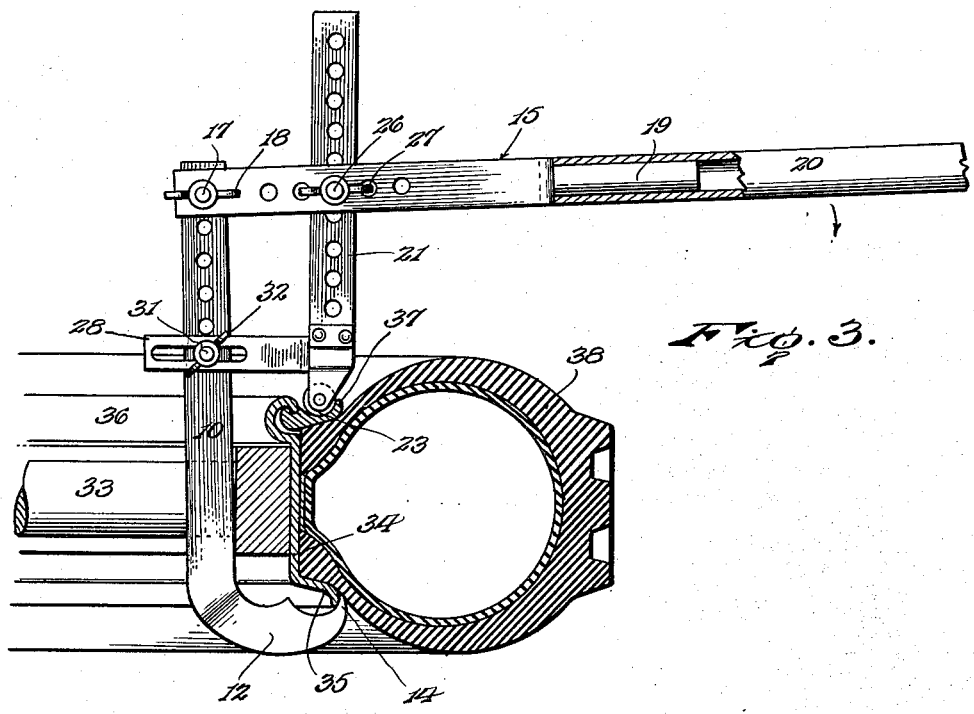
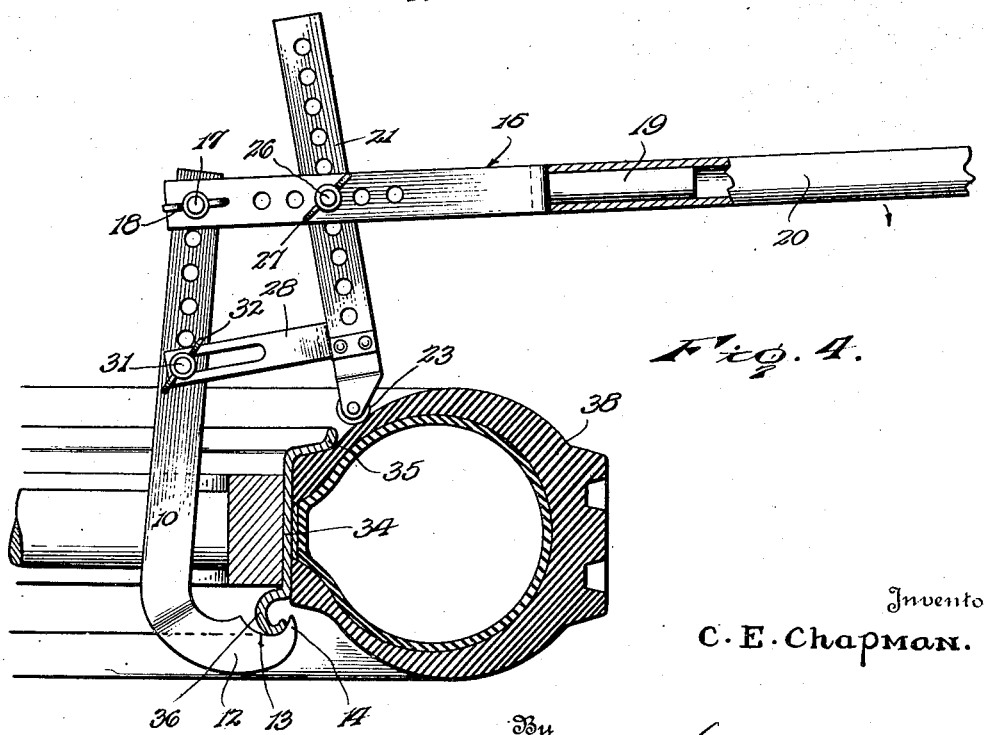

Patented May 27, 1924.

1,495,884

UNITED STATES PATENT OFFICE.

CHARLES E. CHAPMAN, OF FORT EDWARD, NEW YORK, ASSIGNOR OF ONE-HALF TO JOSEPH GOODFELLOW, OF FORT EDWARD, NEW YORK.

TIRE TOOL.

Application filed May 11, 1923. Serial No. 638,406.

*To all whom it may concern:*

Be it known that I, CHARLES E. CHAPMAN, citizen of the United States, residing at Fort Edward, in the county of Washington and State of New York, have invented certain new and useful Improvements in Tire Tools, of which the following is a specification.

This invention relates to an improved tire tool for removing pneumatic tires from wire spoke wheels, wooden spoke wheels, or demountable rims. As is well known, a tire often becomes stuck to the rim due to rusting of the rim or other causes and the invention, therefore, seeks, among other objects, to provide a device whereby a tire may be removed from a wheel rim without the necessity for pounding upon the tire, as is commonly practiced.

The invention seeks, as a further object, to provide a device which may be operated at one side of a wheel for releasing the locking ring of the wheel rim and may then be operated at the opposite side of the wheel for pushing the tire from the rim.

And the invention seeks, as a still further object, to provide a device embodying means for preventing injury to the tire.

Other and incidental objects will appear hereinafter.

In the drawings:

Figure 1 is a perspective view of my improved tire tool, the handle thereof being shown detached, Figure 2 is a detail view of the push bar employed, Figure 3 is an elevation showing the manner in which the device is operated for releasing the locking rim of a wheel rim, the wheel, rim and tire shown being conventionally illustrated in section, and Figure 4 is a view similar to Figure 3, showing the manner in which the device is operated for pushing the tire from the rim after the locking rim has been removed.

In carrying the invention into effect, I employ a hook bar 10 provided at its inner end portion with a plurality of longitudinally spaced openings 11 and formed at its outer end with a thickened laterally directed hook 12 having a concave inner face 13 defining a toe 14 at the free end of the hook curving toward the inner end of the bar. Pivotally connected with the hook bar is a lever bar 15 which is preferably formed from a piece of flat bar material bent at a point midway between the ends thereof to define spaced parallel bar members 16 straddling the hook bar 10 and extending through the end portions of said bar members and through one of the openings 11 of the hook bar 10 is a bolt 17 pivotally connecting the lever bar with the hook bar. The bolt 17 may, of course, be shifted from one of said openings to another for positioning the lever bar upon the hook bar to suit the requirements of different sized wheels, rims or tires, and is equipped with a wing nut 18 to facilitate the removal of the bolt. Suitably fixed to the lever bar at its outer end is a longitudinally directed post 19 and adapted to slidably fit over said post is a removable tubular handle 20 of approved length. Extending between the bar members 16 of the lever bar is a push bar 21 to the outer end of which are riveted or otherwise secured diverging arms 22 and journaled between said arms is a roller 23 extending at right angles to the plane of the bar. Formed in the bar are longitudinally spaced openings 24 adapted to be brought into register with longitudinally spaced pairs of oppositely disposed openings 25 in the bar members 16 to receive a bolt 26 extending through the push bar and through said members. Thus, the bolt may be shifted from one pair of the openings 25 to another for adjusting the push bar with respect to the pivotal center of the lever bar and varying the leverage of the lever bar upon the push bar while, by providing the series of openings 24 in the push bar to selectively receive the bolt, the push bar may be adjusted longitudinally upon the lever bar to suit the requirements of different sized wheels, rims or tires and, preferably, the bolt 26, like the bolt 17, is provided with a wing nut 27 to facilitate the removal thereof. Upstanding from the hook bar 10 is a combined guide and rest 28 for the push bar. Near one end, the guide is bent to define a laterally directed lug 29 to extend beneath the lower edge of the push bar for sustaining the bar and formed in the opposite end portion of the guide is a longitudinally directed slot 30. Selectively engageable through the openings 11 of the hook bar 10 is a bolt 31 extending through said slot and carrying a wing nut 32 clamping the guide in position. Thus, by releasing said nut, the guide may be adjusted longitudinally upon the hook bar while, by shifting the bolt 31 from one of the openings 11 of the hook bar to another of said openings, the guide may be positioned longitudinally of the hook bar.

In Figures 3 and 4 of the drawings, I have shown the manner in which my improved tool is used for removing a tire from a wheel rim. The wheel is conventionally illustrated at 33 and the rim at 34. I have shown the rim as provided at one side with an annular flange 35 and at its opposite side with an annular channel 36 removably receiving a split locking ring 37. The tire is conventionally illustrated at 38, the sides of the tire being held between the flange 35 and said locking ring. Initially, the hook bar 10 is, as shown in Figure 3, inserted through the wheel between adjacent spokes thereof from the side of the rim carrying the locking ring 37, when the toe 14 of the hook 12 of said bar is engaged over the edge of the flange 35 of the rim. The roller 23 of the push bar 21 is then positioned against the locking ring, the guide 28 being adjusted to support the free end of the push bar at the proper elevation. Accordingly, the handle 20 being applied to the post 19 of the lever bar 15, the handle may be swung for rocking said bar toward the wheel and consequently pushing the locking ring inwardly for loosening the ring. In like manner, the tool is applied and operated at different points circumferentially of the locking ring for loosening the ring throughout its entire length as well as loosening the adjacent side of the tire from the ring. The ring may then be removed with facility. Having removed the ring, the hook bar 10 is, as shown in Figure 4, inserted through the wheel between the adjacent spokes thereof from the side of the rim carrying the flange 35 when the concave face of the hook 12 is engaged with the channel member 36 of the rim. The guide 28 is then adjusted for supporting the inner end portion of the push rod in a position to engage the roller 23 with the adjacent side of the tire. Accordingly, the lever bar 15 may then be rocked, by means of the handle 20, toward the wheel for loosening the adjacent side of the tire from the flange 35 of the rim and pushing the tire from the rim. In like manner, the device is applied to the rim and operated at different points circumferentially of the rim for loosening the tire throughout its entire circumference and accomplishing the complete removal of the tire from the rim.

Having thus described the invention, what is claimed as new is:

1. The combination with a lever bar, of rim engaging means pivotally mounting the bar, a push bar adjustable upon the lever bar with respect to the pivotal center thereof and adapted to engage a casing for pushing the casing from the rim when the lever is swung, and an adjustable guide to coact with the push bar for directing the leverage against the casing.

2. The combination with a hook bar to engage a rim, of a lever bar pivotally mounted thereon, a push bar carried by the lever bar to engage a casing upon the rim for pushing the casing from the rim when the lever is swung, and a guide for the push bar carried by the hook bar.

In testimony whereof I affix my signature.

CHARLES E. CHAPMAN. [L. S.]